May 2, 1950     C. W. GREENWOOD     2,506,449
PRESSURE VALVE
Filed Nov. 18, 1946
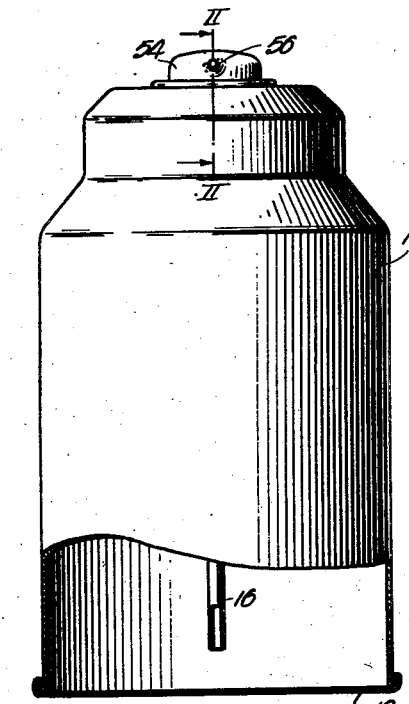
Fig. 1.
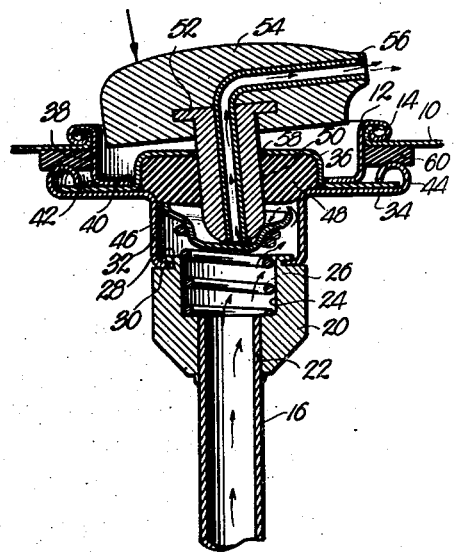
Fig. 3.
Fig. 2.
INVENTOR.
Clifford W. Greenwood
BY
ATTORNEY Patented May 2, 1950

2,506,449

UNITED STATES PATENT OFFICE 2,506,449

PRESSURE VALVE

Clifford W. Greenwood, Neodesha, Kans., assignor, by mesne assignments, to Airosol Company, Inc., Neodesha, Kans., a corporation of Kansas Application November 18, 1946, Serial No. 710,703

9 Claims. (Cl. 222—394)

1

This invention relates to valves of the manually operable type employed to release pressurized liquids and fluids in the form of a spray from a container therefor; and has for its primary aim to provide a valve having means for releasably holding the pressurized liquid within the container until such time that use thereof is desired.

The most important object of this invention is to provide a pressure valve having a manually shiftable discharge pin and a closure member so disposed relative to the said pin that same may be moved to an open position upon shifting of the pin to and from a number of predetermined positions.

Another object of this invention is to provide a pressure valve having a perforated discharge pin provided with yieldable means to hold the same in a normal position and a closure for said opening yieldably held in closed position and operable to an open position upon shifting movement of the discharge pin, whereupon fluid under pressure is free to escape from a container therefor, through the perforation in said pin.

A further object of this invention is to provide a dispensing valve adapted to be used on containers for fluid under pressure, having a closure means provided with yieldable means for holding same in a closed position and formed to present a cup shaped mixing chamber for the fluid as the same passes from the container when the closure means is opened.

A still further object of this invention is to provide in a pressure valve, having aforesaid perforated discharge pin and cup shaped closure member as a part thereof, means for yieldably holding the said member in a closed position; a member for yieldably holding the pin in an inoperable position where fluid is held against escape from a container and the formation of all such parts in such manner as to permit entire removal of the pin to prevent accidental damage thereto during shipment and at the same time prevent escape of fluid from the container through the action of said closure means.

Other objects of this invention include the manner of forming the pin and cup shaped closure to permit egress of fluid into said closure prior to movement of such fluid through the pin; the manner in which all the parts are assembled to present a positive seal against escape of the fluid when the valve is not in use; and the manner in which the valve may be rendered entirely inoperable as a safety precaution as well as against damage during shipment or storage.

2

Additional objects will be made clear or become apparent during the course of the following specification, referring to the accompanying drawing, wherein:

Fig. 1 is a side elevational view of the pressure valve made in accordance with my present invention, showing the same mounted upon a container, parts being broken away for clearness.

Fig. 2 is an enlarged fragmentary central cross-sectional view, taken on line II—II of Fig. 1 and showing the valve in a closed position, and Fig. 3 is a fragmentary sectional view, similar to that shown in Fig. 2 and illustrating the position of the valve when the same is moved to an open position.

The pressure valve about to be described is shown in the drawing mounted upon a conventional can or container 10 adapted to contain fluid under pressure. It is contemplated that this valve be particularly adapted for use on containers for insecticide and more particularly to those insecticides which include the ingredient now well known under the term "DDT."

It is well known by those experienced in the art that insecticides having DDT as one of the principal ingredients thereof, require dispensers capable of breaking the particles of DDT into small units prior to spraying the same from a container therefor, before such insecticides are completely effective. It has heretofore been the practice to place such fluid in containers under a high pressure to attain this object of proper mixing of the DDT particles prior to use, which practice resulted in the necessity of using expensive containers, as well as valves that will positively hold the fluid in its container until the same is ready for use. Through use of the structure about to be described, the necessity of such expensive containers is eliminated and container 10, therefore, need be only of a light character which is relatively inexpensive to manufacture.

Container 10 is provided in one end thereof with an opening 12, defined by an annular out-turned flange 14. The entire valve assembly is mounted within this opening 12 in a manner hereinafter more fully described. An elongated tube 16 within container 10 has one end thereof extending to a point near end wall 18 of container 10 and a collar 20, mounted on the opposite end thereof. This collar 20 has a central bore 22 therethrough, which is enlarged as at 24 as one end thereof is approached for receiving and seating a coil spring 26. Tube 16 is mounted within the opposite end of bore 22. One end of collar 20, adjacent enlarged cavity 24, has an annular out-turned flange 28 for receiving inturned flange 30 of a cup 32. The cup 32, collar 20, and tube 16, when so mounted together, comprise one unit of the entire valve assembly.

Another unit of the assembly is formed of a pair of cups 36 and 38. The cup 38 has a substantially central opening through the normally bottom wall thereof for receiving the cup 36 in an inverted position. When so assembled, these two cups are secured together by fusing or the like, as at 40 and 42. These two assemblies are then attached as is clear in Fig. 2, by rolling the outermost edge of the cup 32 as at 44 to engage the outwardly extending flange of the cup 36. It is clear that such construction presents a hollow chamber between the cavity 24 or collar 20 and the innermost wall of cup 36. Prior to so securing together of these two assemblies, spring 26 is placed in position where the lowermost end thereof rests upon the bottom wall of collar 20, forming cavity 24. A cup shaped closure 46 is then nested within the upper end of spring 26, where such spring yieldably holds closure 46 against the lowermost face of a seat or gasket member 48. This member 48 is preferably rubber-like or formed from a similar resilient substance, and is fitted tightly within the cup 36 and has a portion of its lowermost face bearing against cup 32. A substantially central opening 50 formed at the member 48, tightly receives a discharge pin 52, which extends to a position where the lowermost end thereof rests within closure 46. This pin 52 is mounted within a cap or head 54 and a hollow tube 56 passes through head 54 and pin 52 to place the lowermost end of pin 52 in communication with the exterior of container 10. An opening 58 formed in the inverted cup 36 receives pin 52 and has a diameter slightly larger than the outside diameter of the pin 52.

The entire assembly when so mounted together is then placed within opening 12 of container 10 and the cup 38 is rolled about annular flange 14 of container 10 and a gasket 60 is interposed between rolled portion 44 and the innermost face of container 10 where a positive seal against leakage of fluid within container 10 is presented.

The operation of the valve is obvious upon viewing Figs. 2 and 3. Fig. 2 shows the pin 52 in its normally inoperative position, i. e. having its longitudinal axis in substantial alignment with the axis of container 10. When it is desired to release fluid from container 10, the operator merely presses downwardly upon head 54 at any point along its periphery, which causes the pin 52 to tilt or shift in the manner shown in Fig. 3. Such tilting action is made possible through the yieldable character of member 48 and when such action takes place, the lowermost end of the pin 52 strikes a portion of the side wall on cup-like closure 46, forcing a portion of the same away from the lowermost face of member 48. The flow of fluid is illustrated in Fig. 3 by arrows and this course is upwardly into tube 16, cavity 24, thence into the cup closure 46, whereupon the fluid flows into tube 56, extending from the lowermost end of pin 52 to the outermost extremities of head 54. Release by the operator of exertion upon head 54 will cause pin 52 to return to the normal upright position shown in Fig. 2, because of the action of member 48 and closure 46 and again return to a position where the same is against member 48 and egress of fluid is prevented.

It is notable that no longitudinal reciprocation takes place by the pin 52 and that the tight fit of the same within the opening 50 of member 48 prevents fluid from escaping therearound when operation takes place. The aforesaid object of assuring a positive "break up" of the ingredients of the insecticide within container 10 is fulfilled through the specific formation of closure 46 in that the fluid mixes within the mixing chamber formed by closure 46 prior to flow thereof into tube 56. Consequently container 10 may be of a low pressure type and, therefore, inexpensive manufacture is eliminated.

It is further noted that pin 52 may be entirely removed from association with member 48 by an upward pull exerted on head 54. When this is done, closure 46 remains closed and escape of fluid is prevented. This feature is highly desirable, particularly in shipping in that this head 54 and pin 52 may be attached to the side of container 10 and no damage or leakage is present by accidental contact of parts on the valve with other containers or sides of cartons containing the same. Furthermore, such feature of removal makes the same safe in that children for instance, cannot tamper with a container of insecticide and cause the same to leak and thereby result in harmful effects due to contact with ingredients of the insecticide. Spring 26 yieldingly holds closure 46 in closed position and the lowermost end of pin 52 has been shown as slightly rounded. However, a more positive action may be found by making this end flat or having different contours engageable with the side walls of closure 46.

Manifestly, pressure valves may be made having details of construction different from those shown by the drawing and above described without departing from the spirit of the invention or scope of the appended claims.

Having thus described the invention, what is claimed as new and desired to be secured by Letters Patent is:

1. A dispensing valve adapted for use in a container for fluid under pressure, said valve comprising a swingable discharge pin having an opening therethrough; structure operable only upon swinging of said discharge pin to predetermined positions for releasing fluid from the container through said opening; and yieldable means for holding said structure closed when the pin is swung to another position, said structure sealing the pin from the interior of the container when closed.

2. A dispensing valve adapted for use in a container for fluid under pressure, said valve comprising a shiftable discharge pin having an opening therethrough; structure operable upon movement of said discharge pin to predetermined positions for releasing fluid from the container through said opening; yieldable means for holding said structure closed when the pin is shifted to another position; and an element operable separable from said means for yieldably holding the pin in said last mentioned position, said element cooperating with the structure when the latter is closed in sealing the pin from the interior of the container.

3. A dispensing valve adapted for use in a container for fluid under pressure, said valve comprising a shiftable discharge pin having an opening therethrough; structure operable upon movement of said discharge pin to predetermined positions for releasing fluid from the container through said opening; and yieldable means for holding said structure closed when the pin is shifted to another position, said structure comprising a cup-shaped member separate from the discharge pin and forming a mixing chamber for the fluid as the same passes from the container into said opening.

4. A dispensing valve adapted for use in a container for fluid under pressure, said valve comprising a shiftable discharge pin having an opening therethrough; structure operable upon movement of said discharge pin to predetermined positions for releasing fluid from the container through said opening; yieldable means for holding said structure closed when the pin is shifted to another position; and means for yieldably holding the pin in said last mentioned position, said pin being removably mounted in said last mentioned holding means, said yieldable means for the structure moving the latter to a position closing the container as the pin is removed from its holding means.

5. A dispensing valve adapted for use on a container for fluid under pressure, said valve comprising a perforated discharge pin extending into one end of said container; a cup-shaped member normally closing the container and the perforation in said pin; yieldable means for holding the member in said closed position; and means for yieldably holding the pin in a normally upright position, said pin being engageable with the member for moving the same to an open position with respect to the container and the pin against the action of the holding means for said member as the pin is manually tilted to predetermined positions against the action of said pin holding means.

6. A dispensing valve adapted for use on a container for fluid under pressure, said valve comprising a perforated discharge pin extending into one end of said container; a cup-shaped member normally closing the perforation in said pin; yieldable means for holding the member in said closed position; and means for yieldably holding the pin in a normally upright position, said pin being engageable with the member for moving the same to an open position against the action of its holding means as the pin is manually tilted to predetermined positions against the action of said pin holding means, said yieldable holding means for the pin comprising a resilient rigidly mounted disc tightly encircling the pin.

7. A dispensing valve adapted for use on a container for fluid under pressure, said valve comprising a perforated discharge pin extending into one end of said container; a cup-shaped member normally closing the perforation in said pin; yieldable means for holding the member in said closed position; and means for yieldably holding the pin in a normally upright position, said pin being engageable with the member for moving the same to an open position against the action of its holding means as the pin is manually tilted to predetermined positions against the action of said pin holding means, said yieldable holding means for the pin comprising a resilient rigidly mounted disc tightly encircling the pin, said cup-shaped member having an annular edge resting against one face of the disc when the member is in the closed condition.

8. A dispensing valve for use in a container for fluid under pressure, said valve comprising a tilted, perforated discharge pin; structure normally closing the perforation in the pin, said structure being movable to an open condition as the pin is tilted to predetermined positions with respect to the structure; and means for holding the fluid pressure in the container separate from the pin when the structure is closed.

9. A dispensing valve for use in a container for fluid under pressure, said valve comprising a tilted, perforated discharge pin; structure normally closing the perforation in the pin, said structure being movable to an open condition as the pin is tilted to predetermined positions with respect to the structure; means for holding the fluid pressure in the container separate from the pin when the structure is closed, said structure having a flat portion normally bearing against the pin closing one end of the perforation; and means for forcing the pin laterally away from said flat portion of the structure when the pin is tilted.

CLIFFORD W. GREENWOOD.

REFERENCES CITED

The following references are of record in the file of this patent:

UNITED STATES PATENTS

| Number | Name | Date |
| --- | --- | --- |
| 724,257 | Burton | Mar. 31, 1903 |
| 1,961,371 | Mapes | June 5, 1934 |
| 2,351,751 | Pruin | June 20, 1944 |
| 2,376,404 | Thoms | May 22, 1945 |